UNITED STATES PATENT OFFICE.

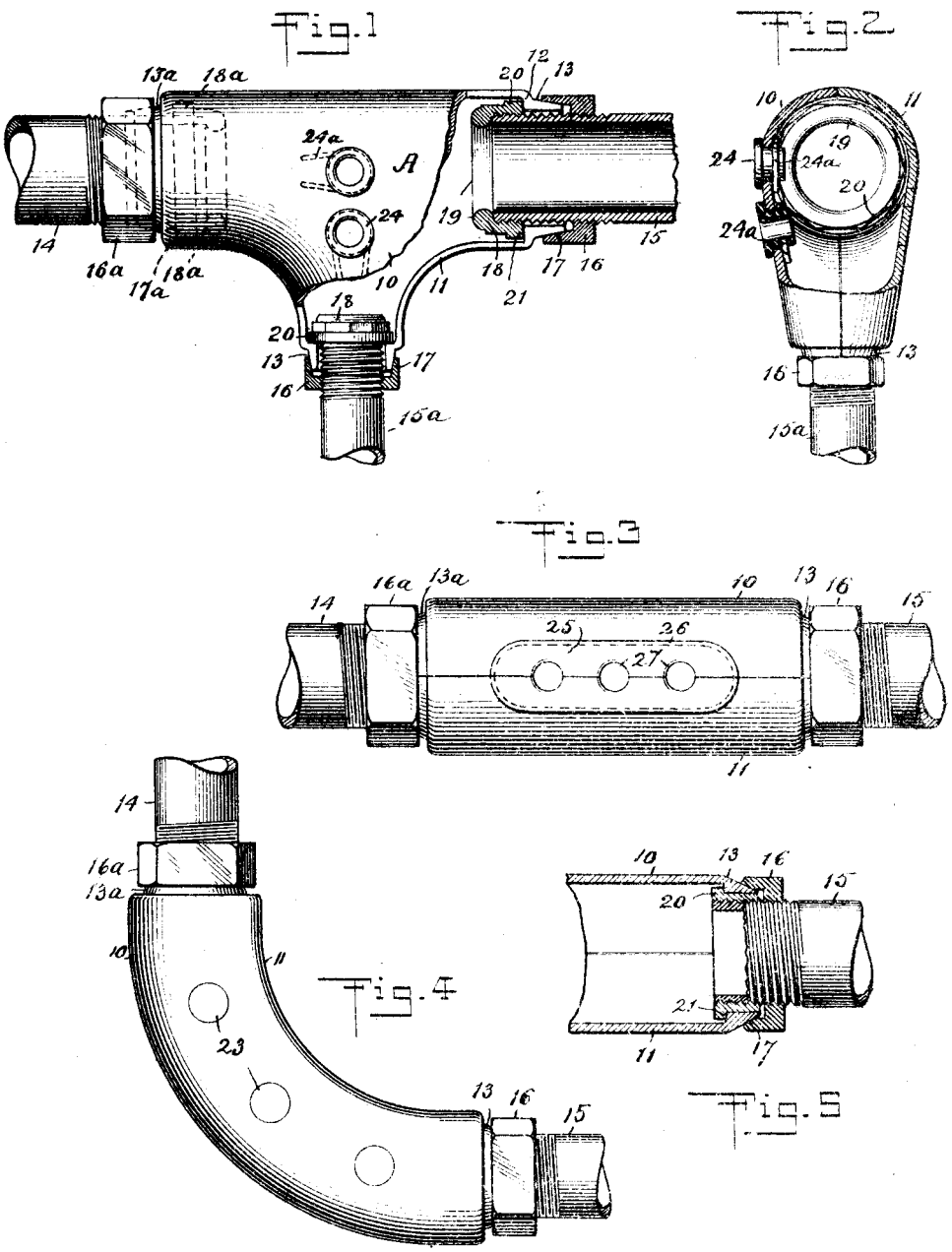

KLAAS SIXMA, OF BROOKLYN, NEW YORK.

FITTING FOR ELECTRICAL CONDUITS.

1,108,259.   Specification of Letters Patent.   Patented Aug. 25, 1914.

Application filed September 3, 1913. Serial No. 787,840.

*To all whom it may concern:*

Be it known that I, KLAAS SIXMA, a subject of the Queen of the Netherlands, residing at Brooklyn, in the county of Kings and State of New York, have invented new and useful Improvements in Fittings for Electrical Conduits, of which the following is a specification.

This invention relates substantially to fittings for electrical conduits such as used in wiring a building for electricity, or for tapping a street main.

Heretofore these fittings have been made in two halves, with extending lugs and bolted together with screws or bolts, through these lugs.

The object of my invention is to provide a fitting which can easily be put together and likewise taken apart in case of repairs.

Another object of my invention is to provide a fitting of this character with outwardly extending tapering nipples which are held together with a tapering lock nut.

Still another object of my invention is to provide a fitting that can be used as a substitute for a pull-box as well as a connector for open wiring.

These fittings can be made into any desired shape and size, such as T's, crosses, elbows, couplings or any other shape as the trade may require.

The invention consists of novel features and parts, and combinations of same, which will be more fully described hereinafter and then pointed out in the claims.

A practical embodiment of my invention is represented in the accompanying drawings, forming part of this specification, in which similar characters of reference indicate corresponding parts in all the views.

Figure 1 is an elevation partly broken away and shown in section, of a T of my preferred construction of a fitting. Fig. 2 is an end view of same, partly broken away. Fig. 3 is an elevation of a coupling which can be used as a pull-box, with insulating material held in position for outside wiring. Fig. 4 is an elevation of an elbow showing "knock outs" also used as a pull-box. Fig. 5 is a fragmentary sectional elevation of a modified form of the coupling.

The fitting A, which in Fig. 1 is shown as a reducing T is made of any suitable material, such as cast or pressed metals or fiber and is made in two halves 10—11, which are made identical with each other.

The outer ends of the " runs " of the T are made somewhat contracted, thereby forming an inside shoulder 12 and terminating with a tapering nipple 13. The loricated conduits 14—15—15ª are threaded at each end and lock nuts 16 are screwed thereon which have inside tapering portions 17, which co-act with the tapered nipple 13 of the body sections 10—11. Over the ends of the loricated conduits 14—15 is screwed a bushing 18 having at its outer end an annular rounded rim 19, which serves as a stop, for the conduits 14—15. An angular flange 20 has a shoulder 21 which co-acts with shoulder 12 of the main portions 10—11. When lock nuts 16—16ª are screwed back to the right and left, see Fig. 1 and bushings 18—18ª are screwed on the ends of the conduit, the fitting members 10—11 may now be slipped over the loricated conduit 14—15 and the bushings 18—18ª will bear against the inside shoulder 12 of the main portions 10—11, and are held there by hand until the lock nuts 16—16ª are screwed against the tapering nipples 13—13ª. It will now be seen that the lock nuts 16—16ª with their tapering portions 17—17ª will force the tapering nipples 13—13ª of the main portion of the fitting 10—11 together, thereby holding said fitting secure and it will be impossible to jar them loose. These fittings may be provided with the usual "knock outs" 23 shown best in Fig. 4. When a connection for open wiring is desired these knockouts may be removed and insulating bushings 24 inserted, and held in position with a spring 24ª now in common use.

The modified form shown in Fig. 5 is similar in construction as shown in Fig. 1, with this difference, however, the members 10—11 do not bear on the top of the thread of the conduits 14—15 as is shown in Fig. 1 but on top of the bushing proper.

In Fig. 3 I have shown an insulated plate 25 with a groove 26 into which the members 10—11 fit. This plate or insulator may be provided with any required number of holes 27 for the reception of wires to be used for open wiring.

I claim:—

1. A conduit fitting of the kind described, comprising a sectional body provided with a tapered tubular nipple, a threaded conduit fitted in the nipple, a bushing having an interiorly threaded portion for engagement with the threads of the conduit, a lock nut to coöperate with the threaded portion of the conduit and the tapered part of the nipple.

2. A conduit fitting of the kind described, comprising a sectional body provided with a tapered tubular nipple, and having a shoulder forming the inner portion of the nipple, a threaded conduit fitted in the nipple, a bushing inserted over the threaded end of the conduit and in contact with the shoulder, a lock nut to engage the threaded part of the conduit and the tapered portion of the nipple.

3. A conduit coupling of the kind described, comprising a sectional body provided with a tubular tapered nipple, and including a shoulder constituting the inner portion of the nipple, a conduit having a threaded end fitted in the nipple, a bushing threaded onto the end of the conduit, said bushing having a rim to engage the end of the conduit and a shoulder to co-act with the shoulder of the body, a lock nut to engage the threaded portion of the conduit and the tapered portion of the nipple.

In testimony whereof I have hereunto set my hand in the presence of two subscribing witnesses.

KLAAS SIXMA.

Witnesses:
JOHN A. BERGSTROM,
WILLIAM MILLER.